J. SMALL.
Corn Sheller.
No. 6,228.
Patented March 27, 1849.
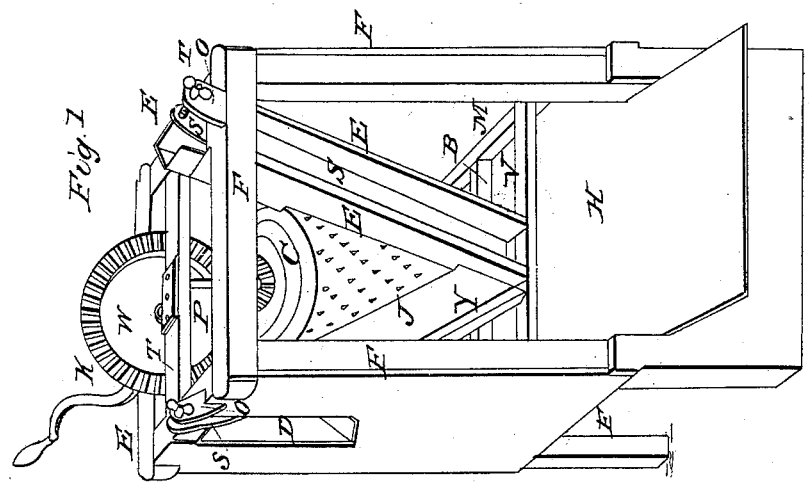
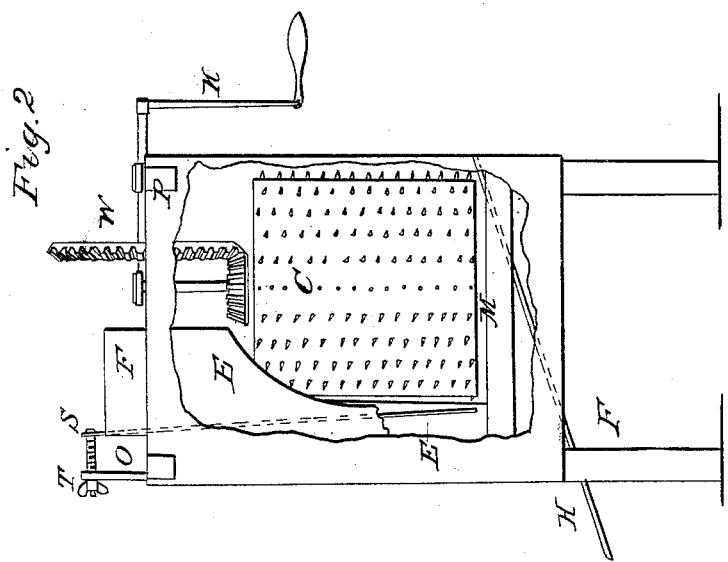

UNITED STATES PATENT OFFICE.

JOHNSTON SMALL, OF BRIDGEWATER, PENNSYLVANIA.

CORN-SHELLER.

Specification of Letters Patent No. 6,228, dated March 27, 1849.

*To all whom it may concern:*

Be it known that I, JOHNSTON SMALL, of the borough of Bridgewater, in the county of Beaver and State of Pennsylvania, have invented a new and useful Machine for Shelling Corn; and I do hereby declare that the following is a full, clear, and exact description of the construction and operation of the same, reference being had to the annexed drawings, making a part of this specification.

The machine consists of a square frame made of 2½ inches square timber as F, Figure 1, three feet high and 13 inches in the clear. Two pieces are framed in the legs 17 inches from the top M. A cross piece B rests upon M on which the cylinder stands. A piece is let in at the side of the frame as V resting upon M upon which the shoots stand. There is a piece P let into the top of the frame 4 inches from the side in which the upper end of the cylinder shaft rests. The shaft of cog wheel W resting upon the top of frame F and cross piece P. The cylinder is formed of 6 pieces castings ¼ inch thick 1 foot long with teeth ½ inch long ⅜ inch thick at butt and tapering to a point. Said cylinder is 11 inches diameter. The cylinder shaft passes through two wooden heads C. There are two plates wrought iron fastened on the inside of the cylinder head and likewise fastened to the shaft to strengthen the heads. The castings that form the cylinder are fastened on with 4 screws one in each corner of plate thus forming the cylinder. The hopper E at top of chute in which the corn is deposited to be shelled rests against the frame 3 inches from the side and running down resting on V. A piece is taken out of the chute E two inches from the bottom of cylinder C forming a connection with chute J through which the cob passes said chute J is similarly formed with chute E and runs to within 1½ inches of top cylinder on opposite side from chute E and resting on boxing of the machine. There also is a piece under chute E resting on the frame running down on cross piece V forming the bottom of chute. There is a boxing running from 3 inches above the top frame F to the top of cylinder thus forming the hopper E. A spring S is attached to the side of frame running down the chute to bottom of cylinder starting above the frame 5 inches. A piece is also let into the frame opposite the spring of equal height of the spring as O, Fig. 2. A bolt passes through spring S and piece O with a spiral spring hung on bolt between them with wing nut T on end of bolt to temper the spring to suit the size of corn. A spring on opposite chute J (Fig. 1) is fastened on the under side of top frame F running down to the bottom of cylinder C extending at the top 5 inches above the frame similar to the one above described. Bevel wheel W has a shaft through its center to which is attached a crank K giving the sheller its rotary motion. The shaft passing through cylinder has a cog wheel hung nigh the top of cylinder gearing with wheel W. The spill H (Fig. 2,) forms the bottom of machine and carries out the corn after it is shelled. Boxing or boarding from spill to top of frame F. Opening D for the cob to pass out on side of machine. Corn is deposited in chute E to be shelled running down to opening in chute E and passes out at the opening at bottom of chute E into chute J then passes up chute J and passing out at opening D thus working the ears of corn over twice thus cleaning the corn if any grains should remain after passing chute E.

The parts which I claim as my own invention are—

The combination of the chute E cylinder C and chute J for feeding and shelling the corn and discharging the cobs as described.

JOHNSTON SMALL.

Attest:
  HIRAM STOW,
  SCUDDER H. DARRAGH.